US009708835B2

(12) United States Patent
Fisher

(10) Patent No.: US 9,708,835 B2
(45) Date of Patent: Jul. 18, 2017

(54) GUN LOCK FOR SECURING A WEAPON WITHIN A VEHICLE GUN RACK

(71) Applicant: Richard Alan Fisher, Huntington Beach, CA (US)

(72) Inventor: Richard Alan Fisher, Huntington Beach, CA (US)

( * ) Notice: Subject to any disclaimer, the term of this patent is extended or adjusted under 35 U.S.C. 154(b) by 0 days.

(21) Appl. No.: 14/815,739

(22) Filed: Jul. 31, 2015

(65) Prior Publication Data

US 2017/0030114 A1    Feb. 2, 2017

(51) Int. Cl.
*E05B 73/00* (2006.01)
*B60R 7/14* (2006.01)

(52) U.S. Cl.
CPC ............. *E05B 73/00* (2013.01); *B60R 7/14* (2013.01); *Y10T 70/404* (2015.04); *Y10T 70/411* (2015.04)

(58) Field of Classification Search
CPC ............. Y10T 70/404; Y10T 70/5009; Y10T 70/5031; Y10T 70/411; B60R 7/14; E05B 73/00
USPC ....... 70/263, 14–1, 186, 58, 63, 277, 53, 40, 70/48
See application file for complete search history.

(56) References Cited

U.S. PATENT DOCUMENTS

| | | | | |
|---|---|---|---|---|
| 229,332 A | * | 6/1880 | Pease ...................... | E05B 67/28 70/40 |
| 636,439 A | * | 11/1899 | Maltby ................... | E05B 75/00 70/17 |
| 691,941 A | * | 1/1902 | Headson ................. | E05B 75/00 70/17 |
| 1,105,632 A | * | 8/1914 | Driebusch ............... | E05B 67/36 70/18 |
| 1,116,329 A | * | 11/1914 | Russell ................... | E05B 75/00 70/16 |
| 1,136,735 A | * | 4/1915 | Taylor ..................... | E05B 67/32 70/18 |
| 1,153,405 A | * | 9/1915 | Rogers ................... | B60G 17/0195 70/339 |
| 1,161,562 A | * | 11/1915 | Wesson ................... | E05B 75/00 24/598.2 |
| 1,317,424 A | * | 9/1919 | Bowman ................. | E05B 75/00 70/17 |
| 1,388,691 A | * | 8/1921 | Bergen ................... | E05B 37/025 70/18 |
| 1,408,133 A | * | 2/1922 | Ochs ...................... | B60R 25/093 70/18 |

(Continued)

*Primary Examiner* — Suzanne Barrett
*Assistant Examiner* — Morgan McClure
(74) *Attorney, Agent, or Firm* — Roy A. Ekstrand

(57) ABSTRACT

A gun lock for use in securing a weapon within a gun rack of a police vehicle or the like utilizes a housing supporting a pair of curved lock gates in curved travel paths between an abutting closed configuration and a separated open configuration. The curved lock gates are constrained in curved travel paths by a top plate and a lower plate and each define a curved gear rack. A coupling gear is rotatably supported within the housing and simultaneously engages both curved gear racks to provide movement of the lock gates between open and closed configuration. A solenoid operated latching mechanism secures the lock gates from movement away from the closed and locked configuration in the absence of an electrical activation. A key override is provided in the event of an electrical failure within the host vehicle.

9 Claims, 10 Drawing Sheets

(56) References Cited

U.S. PATENT DOCUMENTS

| | | | | |
|---|---|---|---|---|
| 1,505,660 A * | 8/1924 | Moersch | E05B 75/00 | 70/17 |
| 1,520,975 A * | 12/1924 | Sterling | E05B 67/28 | 70/18 |
| 1,570,458 A * | 1/1926 | Cederlof | E05B 75/00 | 70/17 |
| 1,719,698 A * | 7/1929 | Gross | E05B 75/00 | 70/17 |
| 1,746,890 A * | 2/1930 | Gill | E05B 75/00 | 70/16 |
| 1,950,757 A * | 3/1934 | Smith-Stange | E05B 75/00 | 119/806 |
| 2,066,654 A * | 1/1937 | Smith-Stange | E05B 75/00 | 70/17 |
| 2,344,348 A * | 3/1944 | Forsell | E05B 75/00 | 70/17 |
| 2,383,077 A * | 8/1945 | Powell | E05B 75/00 | 70/17 |
| 3,826,114 A * | 7/1974 | Emerson | E05B 73/00 | 70/14 |
| 3,844,146 A * | 10/1974 | Fouces | B62H 5/144 | 70/227 |
| 4,519,226 A * | 5/1985 | Hadaway | E05B 67/28 | 70/48 |
| 4,823,568 A * | 4/1989 | Rogers | B68C 1/02 | 70/14 |
| 5,247,815 A * | 9/1993 | Caldwell | B60R 25/093 | 188/32 |
| 5,291,762 A * | 3/1994 | Fornaro | B60R 25/023 | 70/18 |
| 5,479,943 A * | 1/1996 | Kuhnell, III | E05B 75/00 | 128/846 |
| 5,555,751 A * | 9/1996 | Strickland | E05B 75/00 | 70/16 |
| 5,582,042 A * | 12/1996 | Mordick | E05B 67/383 | 70/14 |
| 5,673,574 A * | 10/1997 | Bertram | B60R 25/093 | 70/18 |
| 5,802,889 A * | 9/1998 | Arnold | B62H 5/14 | 211/5 |
| 5,934,112 A * | 8/1999 | Rice | B60R 7/14 | 211/64 |
| 5,956,980 A * | 9/1999 | Jenkins, Jr. | E05B 73/0005 | 24/598.5 |
| 6,896,232 B2 * | 5/2005 | Crowell | B25B 5/06 | 248/229.12 |
| 7,246,575 B2 * | 7/2007 | Goto | A01K 15/003 | 119/770 |
| 8,313,128 B2 * | 11/2012 | Belyea | E05B 13/00 | 292/258 |
| 8,826,702 B1 * | 9/2014 | Barger | E05B 73/00 | 211/4 |
| 8,839,796 B2 * | 9/2014 | Reese | E05B 75/00 | 128/875 |
| 2003/0041631 A1 * | 3/2003 | Yin | E05B 73/0005 | 70/58 |
| 2006/0048551 A1 * | 3/2006 | Tanos | E05B 15/0046 | 70/18 |
| 2006/0272365 A1 * | 12/2006 | Copus | E05B 13/002 | 70/14 |
| 2007/0013478 A1 * | 1/2007 | Crigger | A47B 81/005 | 340/5.53 |
| 2007/0289342 A1 * | 12/2007 | Brooks | E05B 47/0002 | 70/16 |
| 2010/0018263 A1 * | 1/2010 | Ben Yehuda | E05B 75/00 | 70/16 |
| 2011/0126597 A1 * | 6/2011 | Irisawa | F41B 15/02 | 70/16 |
| 2012/0024023 A1 * | 2/2012 | Trank | B60R 25/001 | 70/15 |
| 2012/0152883 A1 * | 6/2012 | Zhang | E05B 73/0041 | 215/201 |
| 2013/0205844 A1 * | 8/2013 | Lai | E05B 37/025 | 70/25 |
| 2014/0260455 A1 * | 9/2014 | Dewalch | E05B 47/0009 | 70/283.1 |
| 2014/0305175 A1 * | 10/2014 | Irwin | F41A 23/18 | 70/14 |
| 2014/0352369 A1 * | 12/2014 | Dasbach | E05B 71/00 | 70/15 |
| 2015/0033810 A1 * | 2/2015 | Zalavari | A47B 81/00 | 70/266 |
| 2015/0128668 A1 * | 5/2015 | Meredith | F41A 23/18 | 70/266 |
| 2015/0184428 A1 * | 7/2015 | Zalavari | E05B 73/00 | 70/13 |

\* cited by examiner

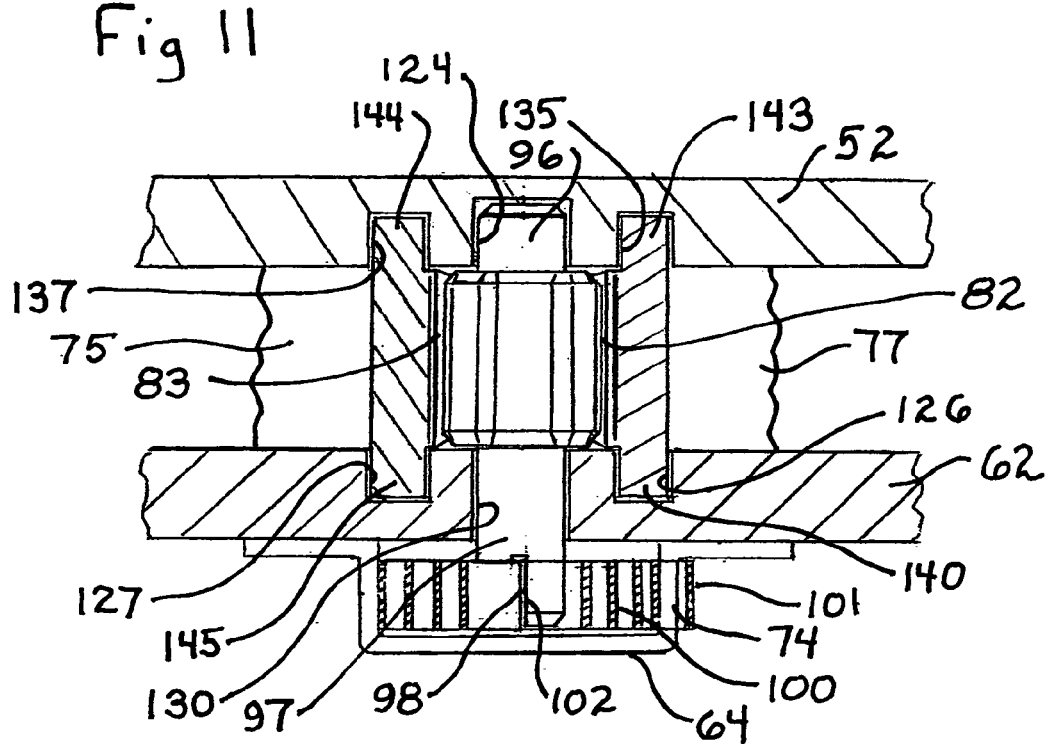
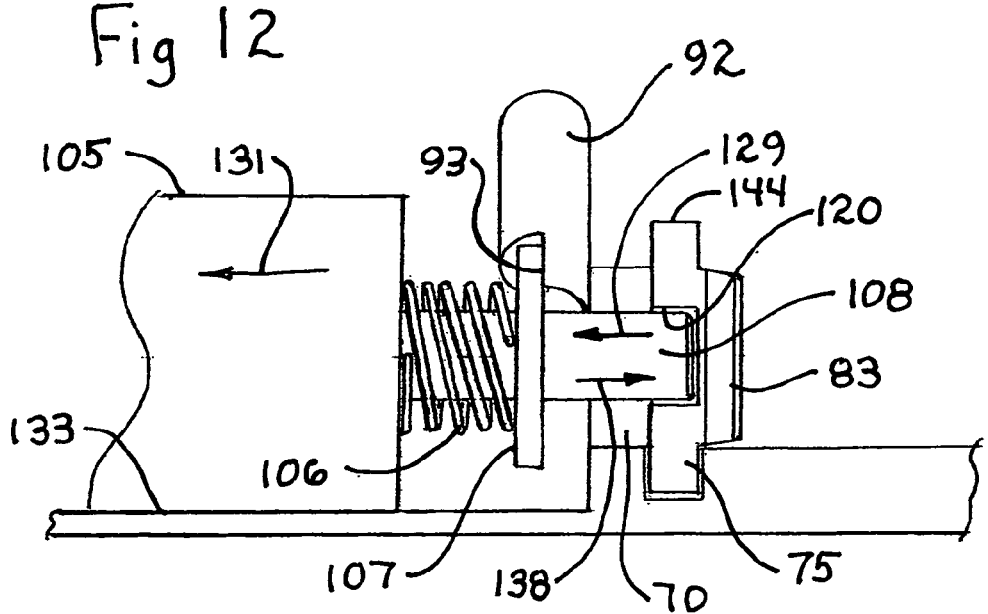

GUN LOCK FOR SECURING A WEAPON WITHIN A VEHICLE GUN RACK

FIELD OF THE INVENTION

This invention relates generally to apparatus for securing one or more weapons within a vehicle interior and particularly to the portion of such apparatus known in the art as "gun locks".

BACKGROUND OF THE INVENTION

In most modern police patrol vehicles, often referred to as "cruisers" a gun rack is supported within the vehicle interior which in turn receives supports and secures one or more weapons. In one common application, a rigid gun rack is supported upon the vehicle transmission hump portion between the vehicle front seats. A variety of attachment apparatus are employed to secure the gun rack to the vehicle floor hump and/or to a prisoner screen of the type usually positioned behind the vehicle front seats.

While the design of gun rack of the type situated within the vehicle interior has been subject to substantial variation, in general, most gun racks utilize a base secured to the vehicle floor hump together with an upwardly extending vertical riser portion. The upper surface of the base supports one or more (butt shoes) configured to receive the end portion of weapon stock. The weapon securing apparatus is completed by the attachment of one or more gun locks secured to the riser portion of the gun rack at a position which facilitates captivating a portion of the secured weapon.

While a gun rack may be constructed and configured to secure a single weapon, the most prevalent configuration of the gun rack situated between vehicle front seats provides supports for a pair of weapons. Thus, a typical gun rack includes a base supporting a pair of butt shoes together with a vertically extending riser. The gun rack is typically secured solidly to the vehicle floor hump and may be additionally secured to the prisoner screen should the vehicle have one. A pair of gun locks are secured to the vertical riser of the gun rack at a position suited to the shape of the to-be-secured weapon. A typical gun lock provides a gun lock body which defines an open front receptacle shaped to receive the secured portion of the weapon. A locking gate is pivotally supported upon the gun lock body and is movable between an open position away from the receptacle and a closed or locked position in which the locking gate spans or closes the open front of the gun lock receptacle thereby captivating and securing the weapon therein.

In a typical operation, a weapon is secured within the gun rack by initially fitting the end of the gun stock often referred to as "butt" into the butt shoe. With the gun butt remaining in the butt shoe the weapon is pivoted into the gun lock receptacle and the locking gate is pivoted from its open position to its locked position in which it bridges and closes the open face of the weapon receiving receptacle. A locking or latching mechanism is supported within the gun lock body and is operative to secure the locking gate in its closed and locked position. At this point, the weapon is secured within the gun rack.

In general, the gun lock may be opened or released by utilizing a conventional key and lock mechanism. In addition, in most applications, an electric release mechanism is provided which utilizes a solenoid lock release mechanism within the gun lock body together with a remotely located release button. The electrical release mechanism is provided for the purpose of allowing the police officer to quickly release the gun lock and access the weapon without the need for using a key. For purposes of maintaining safety and security, the electric release button is typically "hidden" within the vehicle interior at a location known only to the police officer operating the vehicle.

Once the gun lock securing mechanism has been released, either by use of a key or remote hidden button and electrical release, the officer then grabs the locking gate and pivots it away from the gun lock receptacle outwardly to its open position. At this point, the weapon is available for removal from the gun rack. In common practice, most police officers prefer to release the gun lock using the electric release allowing the police officer to grab the locking gate and pull it open with one hand while grasping the weapon with the other hand. This allows the quickest access to the weapon.

To best facilitate the use of the electric release button system, a timer is integrated into the electrical release system which provides an unlocked condition for the gun lock for a predetermined time interval following the activation of the release button. This timer system maintains the unlocked configuration of the gun lock for a predetermined time interval after which the lock mechanism again engages and the gun lock is once again locked and secured. The use of this timed interval protects the activation circuitry within the gun lock from damage which would occur in the event the electrical system maintained the gun lock in an unlocked configuration for an extended period of time. In a typical operational scenario, officers arriving at a situation in which access to the secured weapons is likely to be required, activate the electric release and utilize the time interval to decide whether or not to access the weapons as the situation develops.

Once a weapon has been removed from the gun rack, it may be returned to the gun rack by once again placing the gun butt into the butt shoe and pivoting the weapon into the lock receptacle. Thereafter, the locking gate is pivoted to the closed and lock position and the locking mechanism secures the gate. In the preferred fabrication of gun locks, the locking or latching mechanism operative upon the locking gate will automatically latch and secure the locking gate upon closure.

As mentioned above, a gun rack may be configured to receive and support a single weapon. However, typically gun racks of the type described above accommodate a pair of weapons. In most applications, two different types of weapons are situated within the vehicle in order to best meet the variety of operational situations encountered by police officers. Perhaps one of the most commonly employed weapons pairs used by police officers within patrol vehicles includes a shot gun such as a REMINGTON 870 together with a COLT AR 15 automatic rifle. The substantial differences in size, shape and configuration between weapons in such as weapon pair has here-to-for required that individual gun locks configured to accommodate each type of weapon be provided within the vehicle. Thus, in a typical pair of gun locks within the vehicle, one of the gun locks is configured to receive and secure a shot gun while the remaining gun lock is configured to receive and secure an AR 15 automatic rifle.

While the foregoing described gun locks have to some extent improved the art and in some instances enjoyed commercial success, they remain subject to a number of undesirable limitations which are as of yet unresolved. For example, the necessity for manually pivoting the lock gate to its open position once the lock has been released, necessitates the simultaneous use of both hands by an officer attempting to rapidly access the weapon. Further, the presently available gun locks tend to be prohibitively large and heavy and occupy a substantial area of space between the vehicle seats. This problem is exacerbated by the swing clearance required by the pivoting lock gate. In further addition, the large size and bulky character of the presently available gun locks often occupies substantial space upon the secured weapon which in turn interferes with various weapon attachments that might otherwise be desired by the user. At present, individual specially configured locks designed to receive a given weapon are required. This adds to the inventory of gun locks which must be maintained by a police organization to suit the variety of weapons in use. Also, the use of a protective electric timing apparatus to avoid damage to the gun lock activation circuitry adds considerable expense and complexity to the overall system. As a result, there remains a continuing and unresolved need in the art for ever more improved gun locks.

SUMMARY OF THE INVENTION

Accordingly, it is a general object of the present invention to provide an improved gun lock which overcomes the deficiencies and limitations of the prior art and which provides instant one hand access to a weapon upon gun lock release and which provides a gun lock which is smaller in size and weight and which does not occupy a prohibitive space within the vehicle gun rack. It is a more particular object of the present invention to provide an improved gun lock in which a single gun lock design is suitable for use with both automatic rifle and shot gun type weapons. It is a still more particular object of the present invention to provide an improved gun lock which avoids the need for a lock timer in the electrical release circuitry of the gun lock.

In accordance with the present invention, there is provided a gun lock comprising: a gun lock body defining a mounting surface and an open sided gun receptacle; a pair of lock gates each defining a gear rack and an end; a plurality of guides guiding the pair of lock gates between a closed position in which the ends of the pair of lock gates meet and an open position in which the ends are spaced apart exposing the gun receptacle; a coupling gear between the gear racks engaging each of the gear racks simultaneously; and a lock post engaging at least one of the lock gates when the pair of lock gates are in the closed position.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 11 sets forth a partial section view of the present invention gun lock taken along section lines 11-11 in FIG. 10; and FIG. 12 sets forth a partial section view of the solenoid operated latch mechanism of the present invention gun lock.

DESCRIPTION OF THE PREFERRED EMBODIMENTS OF THE INVENTION

Figure 1:
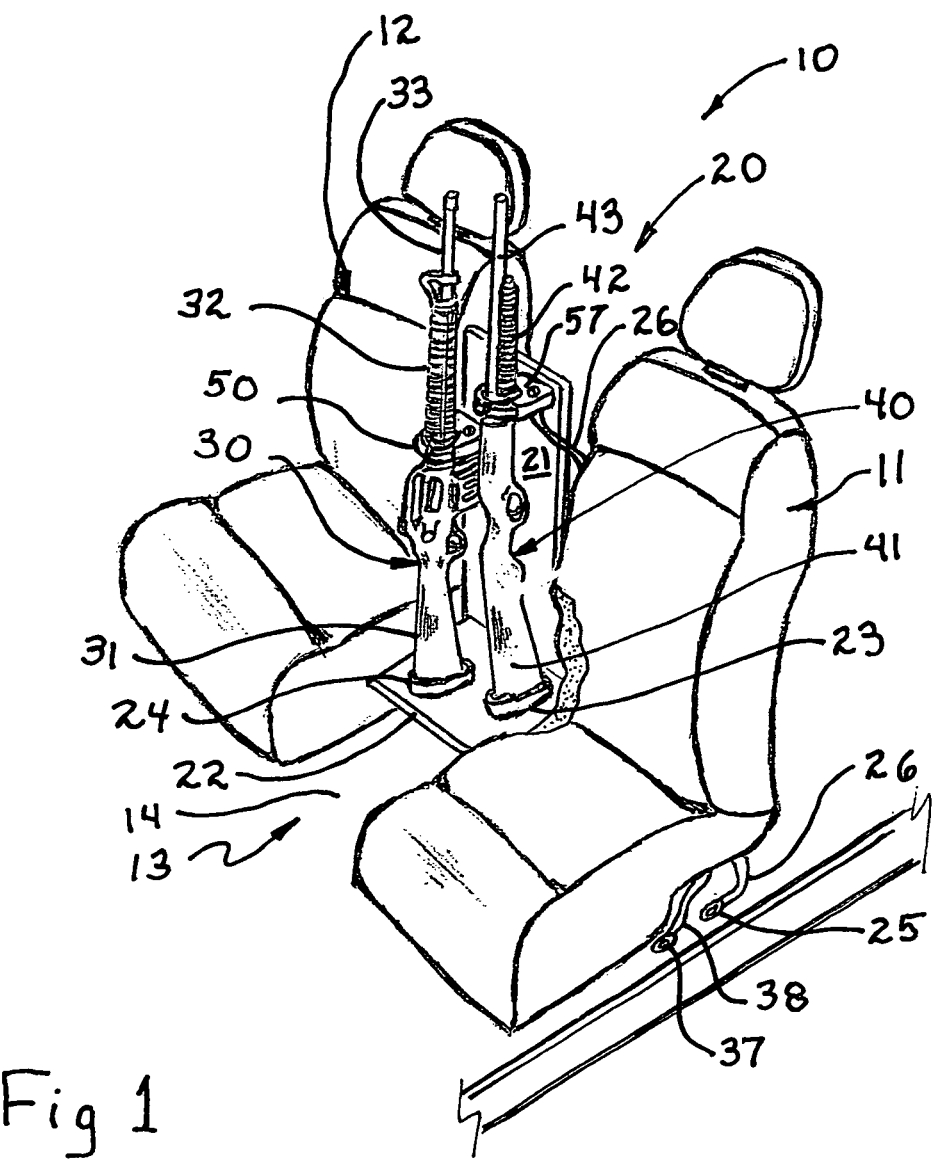
FIG. 1 sets forth a partial perspective view of a portion of a typical police vehicle having a gun rack and the present invention gun locks therein.

FIG. 1 sets forth a partial perspective view of a vehicle interior generally referenced by numeral 10. Vehicle interior 10 is intended to illustrate the front seat arrangement of a typical police control car or cruiser of the type which advantageously makes use of a gun rack having a pair of the present invention gun locks. More specifically, vehicle interior 10 includes a pair of front seats 11 and 12 secured to the vehicle floor by conventional support means (not shown) and defining a space 13 therebetween. In accordance with conventional vehicle fabrication, space 13 also will likely be occupied by a transmission hump or raised vehicle floor defining a floor surface 14 between seats 11 and 12. In further accordance with conventional gun rack fabrication, a gun rack 20 includes a base 22 secured to floor surface 14 by conventional attachment bolts and the like (not shown). Gun rack 20 further includes a vertical riser 21 extending upwardly from base 22. In further accordance with conventional fabrication techniques, base 22 further supports a pair of butt shoes 23 and 24.

As described thus far, gun rack 20 is substantially fabricated in accordance with conventional fabrication techniques. In addition, however, gun rack 20 departs from the prior art structure and techniques in that it supports a pair of the present invention gun locks 50 and 51 each secured to riser 21 by a plurality of threaded fasteners (seen in FIGS. 4 and 5). Gun locks 50 and 51 are constructed in accordance with the present invention and utilize a structure set forth below in greater detail. Suffice it to note here that gun locks 50 and 51 having been secured rigidly to riser 21 are utilized in gripping, captivating and locking critical attachment points on a pair of stored weapons. For purposes of illustration, gun lock 20 is shown supporting an automatic rifle 30 which may, for example, comprise a COLT AR 15 automatic rifle. In addition, gun rack 20 supports a shot gun 40 which may, for example, comprise a REMINGTON model 870 pump shot gun. Automatic rifle 30 includes a butt stock 31, the end of which is received within butt shoe 24. Similarly, shot gun 40 includes a butt stock 41, the end of which is received within butt shoe 23. For each weapon, the combination of the butt stock being received within the butt shoe of the gun rack together with the secure grip of the weapon by the present invention gun lock fully secures the weapon within gun rack 20.

The structure and operation of the present invention gun lock is described below in greater detail. Suffice it to note here that in accordance with an important aspect of the present invention, the gun lock provided is able to secure different weapons by means set forth below in greater detail. That is to say, the present invention gun lock is capable of securing either an automatic rifle such as automatic rifle 30 or a shot gun such as shot gun 40. This provides a substantial economic and convenience advantage for the present invention gun lock in that police departments and the like utilizing such gun locks need only maintain a stock and supply of a single gun lock rather than a plurality of gun locks each configured to secure a specific weapon. This further enhances the efficiency of the maintenance and installation operations within the police departments and the like.

In accordance with the anticipated use of gun locks 50 and 51, a pair of hidden remote electric activation buttons 25 and 37 are shown discreetly placed alongside seat 11. A plurality of wires 26 couples button 25 to gun lock 51 while a plurality of wires 38 couples button 37 to gun lock 50. This describes the above-described electric activation which police departments typically utilize in such gun securing apparatus. As is also described below, the present invention gun lock includes a key override mechanism in which an officer may utilize a key to manually unlock the gun lock should that need arise such as may be occasioned by a power failure with the vehicle. The operation of the key override and remote button electric activation of the present invention gun lock is set forth below in greater detail. Suffice it to note here that the user is able to open gun locks 50 and 51 either by manipulation of an inserted key within the key lock override or activation of buttons 25 and 37. In accordance with an important aspect of the present invention described below in greater detail, it will be noted that the opening of gun locks 50 and 51 is entirely facilitated using a single hand. Unlike prior art apparatus which requires manual pivoting of the gun lock gate to free the weapon, the present invention gun lock once activated makes the weapon immediately available and accessible to the officer without further manipulation of the gun lock.

Figure 2:
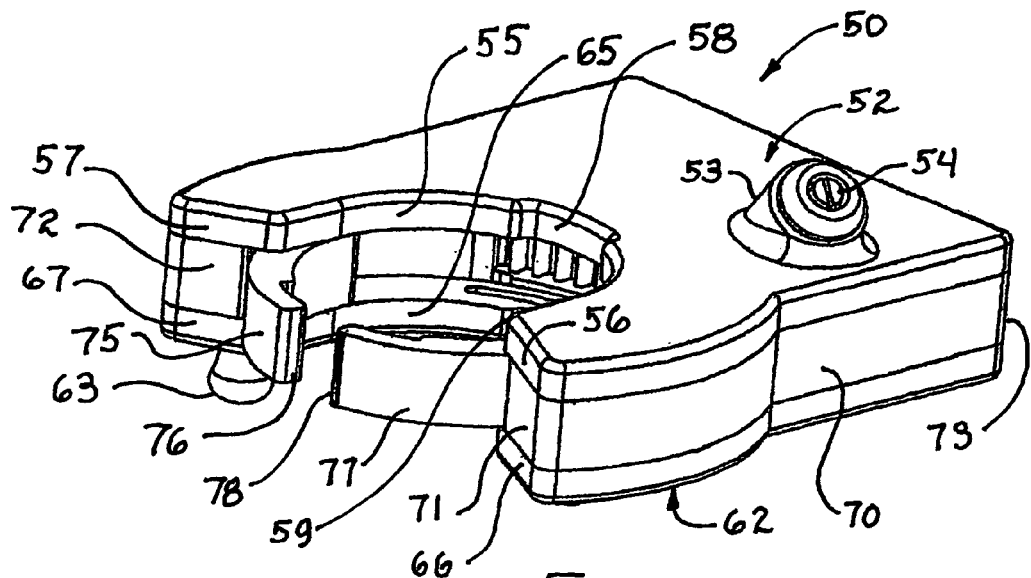
FIG. 2 sets forth a top perspective view of a gun lock constructed in accordance with the present invention.
Figure 9:
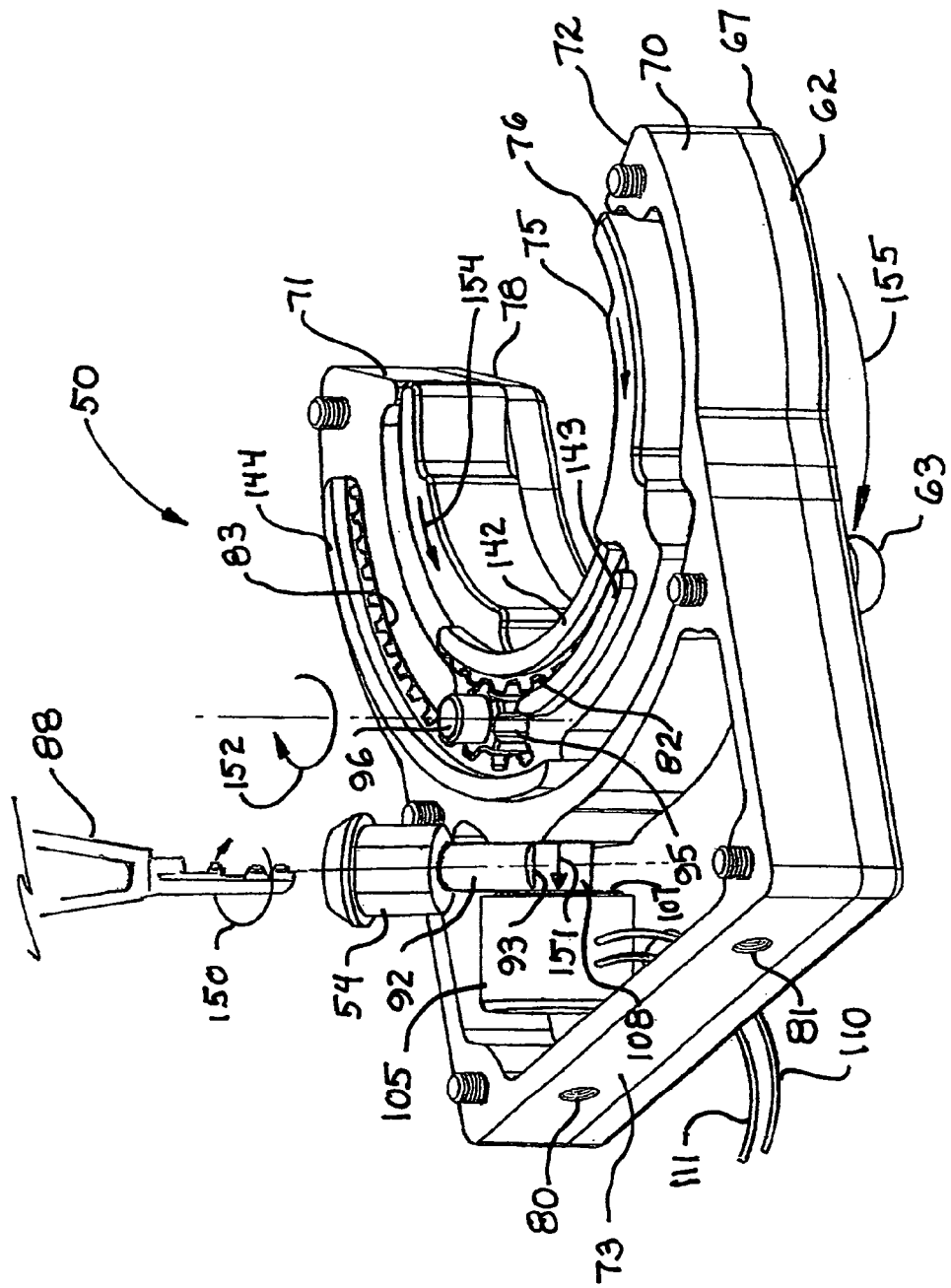
FIG. 9 sets forth a top perspective view of the present invention gun lock having the upper cover plate removed.
Figure 10:
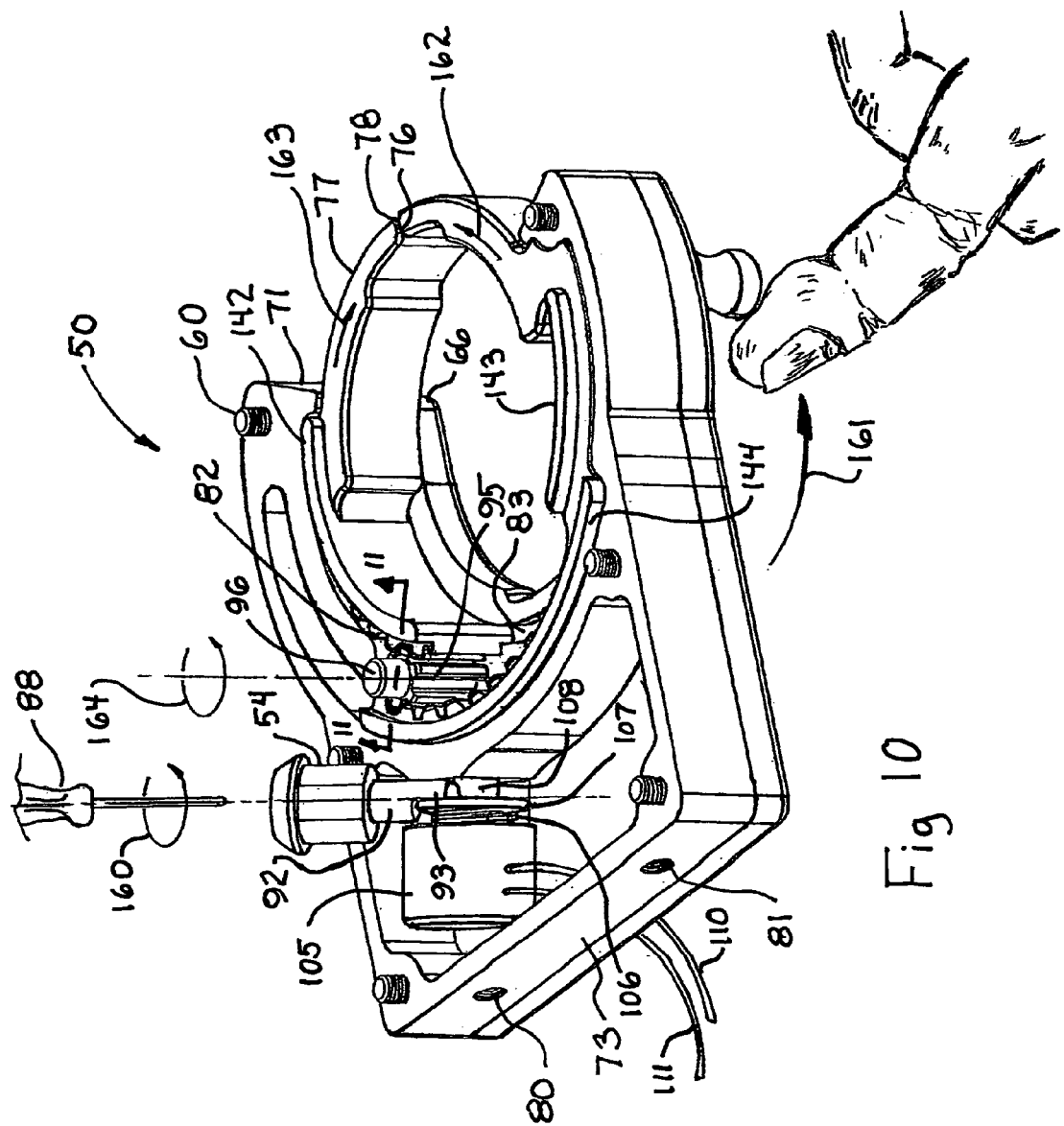
FIG. 10 sets forth a top perspective view of the present invention gun lock having the top plate removed and illustrating the closure of the gun lock mechanism.

FIG. 2 sets forth a front perspective view of a gun lock constructed in accordance with the present invention and generally referenced by numeral 50. Gun lock 50 includes a housing formed of a spacer 70, a top plate 52 and a bottom plate 62 secured to form an integral housing by a plurality of fasteners 60 (seen in FIG. 3). Top plate 52 includes an upwardly angled key lock housing 53 within which a key lock mechanism 54 is received. The operation of key lock mechanism 54 is described below in greater detail in FIGS. 9 and 10. However, suffice it to note here that key lock mechanism 54 receives a key and is utilized in providing the above-mentioned key override by which an officer is able to open gun lock 50. Top plate 52 further defines a pair of curved end portions 56 and 57 together with an open face gun receptacle 55. The interior portion of gun receptacle 55 defines a notch 58. Similarly, bottom plate 62 defines curved end portions 66 and 67 together with a curved gun receptacle 65 having a notch 59 formed in the interior portion thereof. Notch 59 is in alignment with notch 58 of top plate 52. Similarly, gun receptacle 65 of bottom plate 62 is in alignment with gun receptacle 55 of top plate 52. Gun lock 50 further includes a pair of curved lock gates 75 and 77 defining respective ends 76 and 78. By means set forth below in detail, curved lock gates 75 and 77 are movable between a fully open position shown in FIG. 9 and a fully closed and locked position shown in FIG. 10. FIG. 2 illustrates lock gates 75 and 77 partially open and thus a space is defined between ends 76 and 78 thereof. Gun lock 50 further includes a lock slide 63 which, as is shown in FIGS. 9 and 10, allows the user to manually close lock gates 75 and 77 to secure a weapon therein.

Figure 3:
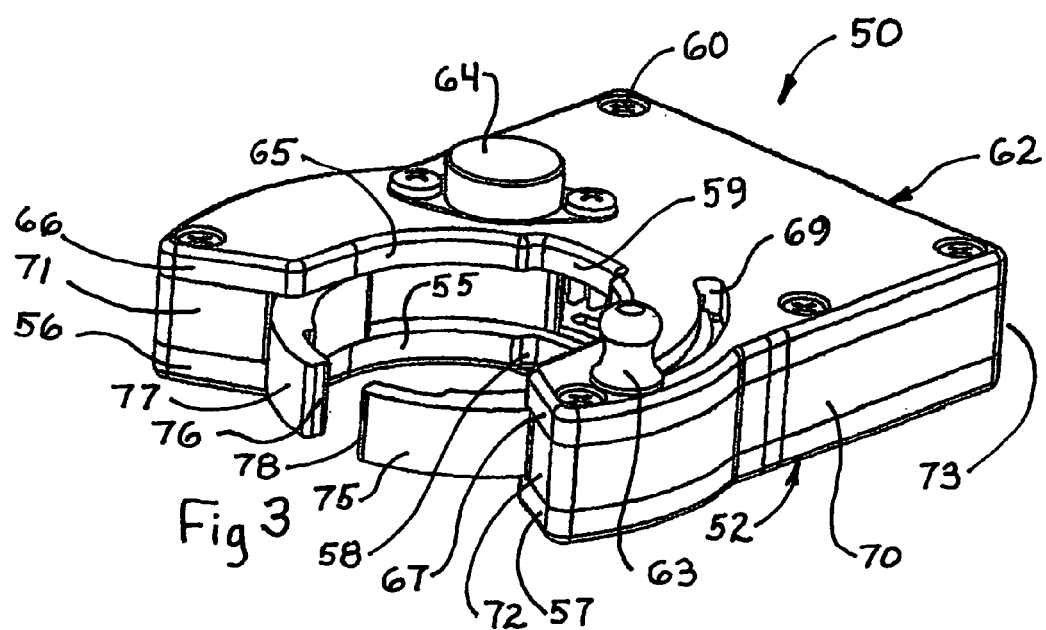
FIG. 3 sets forth a bottom perspective view of the present invention gun lock.

FIG. 3 sets forth a bottom perspective view of gun lock 50 having the lock gates thereof partially open. As described above, gun lock 50 includes a housing formed of a spacer 70 having a top plate 52 and a bottom plate 62 secured thereto. A plurality of threaded fasteners 60 pass through apertures in bottom plate 62 and spacer 70 to be received within threaded apertures formed in top plate 52 (seen in FIG. 8). As is also described above, top plate 52 defines curved end portions 56 and 57 while spacer 70 defines curved ends 71 and 72 and bottom plate 62 defines curved ends 66 and 67. As is also described above, top plate 52 defines a gun receptacle 55 and a notch 58. Bottom plate 62 also defines a gun receptacle 65 and a notch 59. Gun lock 50 further includes a pair of curved lock gates 75 and 77 having ends 76 and 78. Bottom plate 62 further supports an spring cap 64 which, as is better seen in FIG. 6, receives a gear and spring mechanism described below. Bottom plate 62 further defines a curved slot 69 which facilitates the movement of lock slide 63 utilized in moving lock gates 75 and 77 to the closed position shown in FIG. 10.

Figure 4:
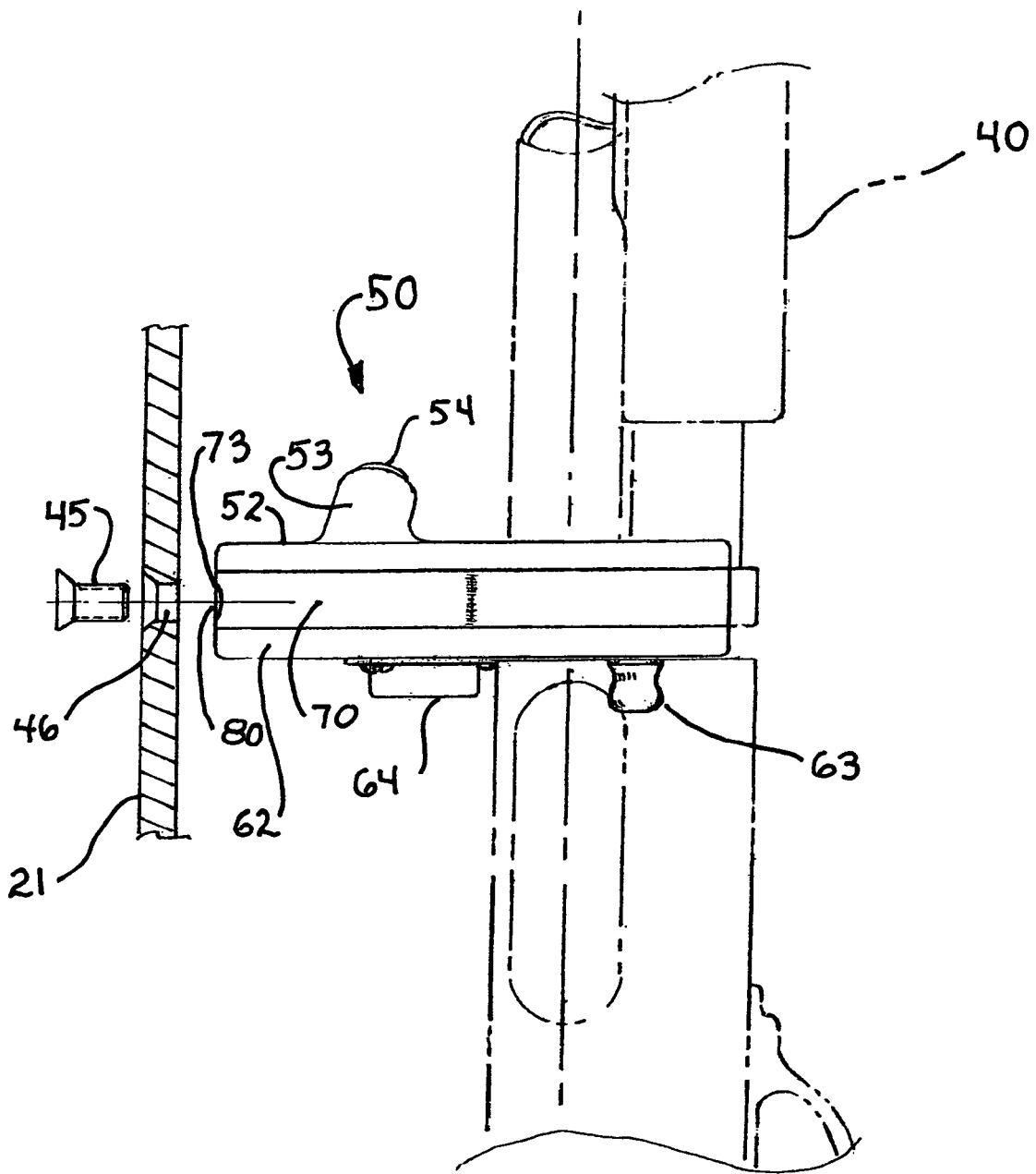
FIG. 4 sets forth a left side elevation view of the present invention gun lock showing a portion of a secured shot gun in phantom line depiction.

FIG. 4 sets forth a left side view of gun lock 50 prepared for assembly to riser 21. A portion of riser 21 is shown in section view to facilitate the illustration of the support mounting of gun lock 50 thereto. Accordingly, gun lock 50 includes a housing formed of a top plate 52, a bottom plate 62 and a spacer 70 between. Gun lock 50 further includes a lock slide 63 and spring cap 64 extending downwardly from bottom plate 62. As described above, top plate 52 includes an upwardly angled key lock housing which in turn supports a key lock mechanism 54. A mounting surface 73 is formed at the rear portion of spacer 70 and defines a pair of threaded mounting apertures 80 and 81 (seen in FIG. 7). For purposes of illustration, riser 21 is shown as a partial section view defining an aperture 46 therein. By way of further illustration, a high strength threaded fastener 45 sized to be threadably received within aperture 80 is shown in FIG. 4. Thus, gun lock 50 is secured to riser 21 by a threaded fastener 45 passed through aperture 46 and engaging threaded aperture 80 (seen in FIG. 7). With temporary reference to FIG. 5, riser 21 is shown further defining an aperture 48 which receives a threaded fastener 47 within threaded aperture 81 formed in spacer 70.

Returning to FIG. 4, gun lock 50 is secured to riser 21 by a plurality of threaded fasteners which engage apertures formed in riser 21. As a result, gun lock 50 is secured to riser 21. For purposes of illustration, FIG. 4 shows gun lock 50 receiving shot gun 40, a portion of which is shown in phantom-line depiction. In accordance with an important aspect of the present invention and as is illustrated in FIG. 5, gun lock 50 is also capable of receiving and securing automatic rifle 30, a portion of which is shown in FIG. 5 in phantom-line depiction.

Figure 5:
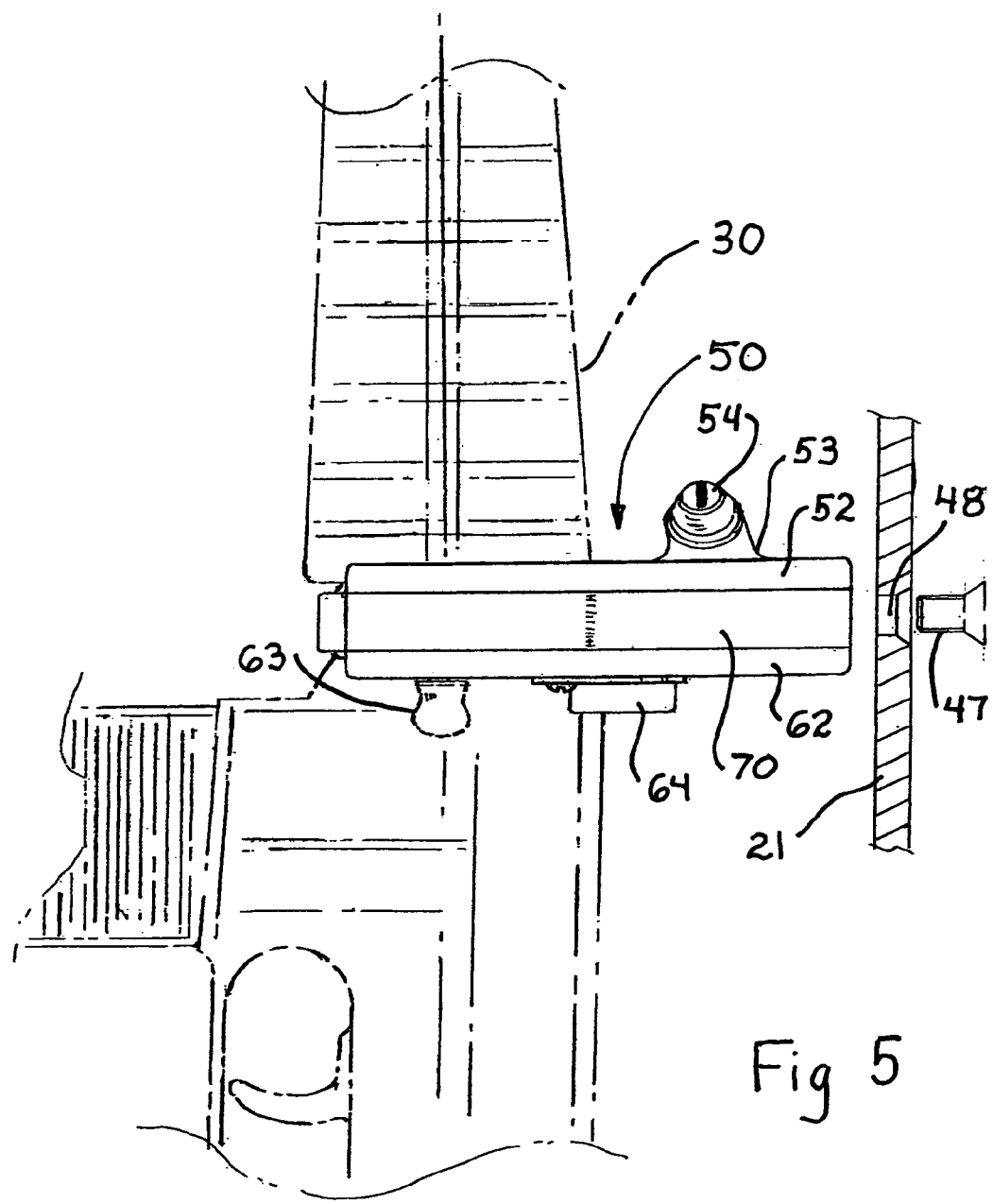
FIG. 5 sets forth a right side elevation view of the present invention gun lock showing a portion of a secured automatic rifle in phantom line depiction.
Figure 7:
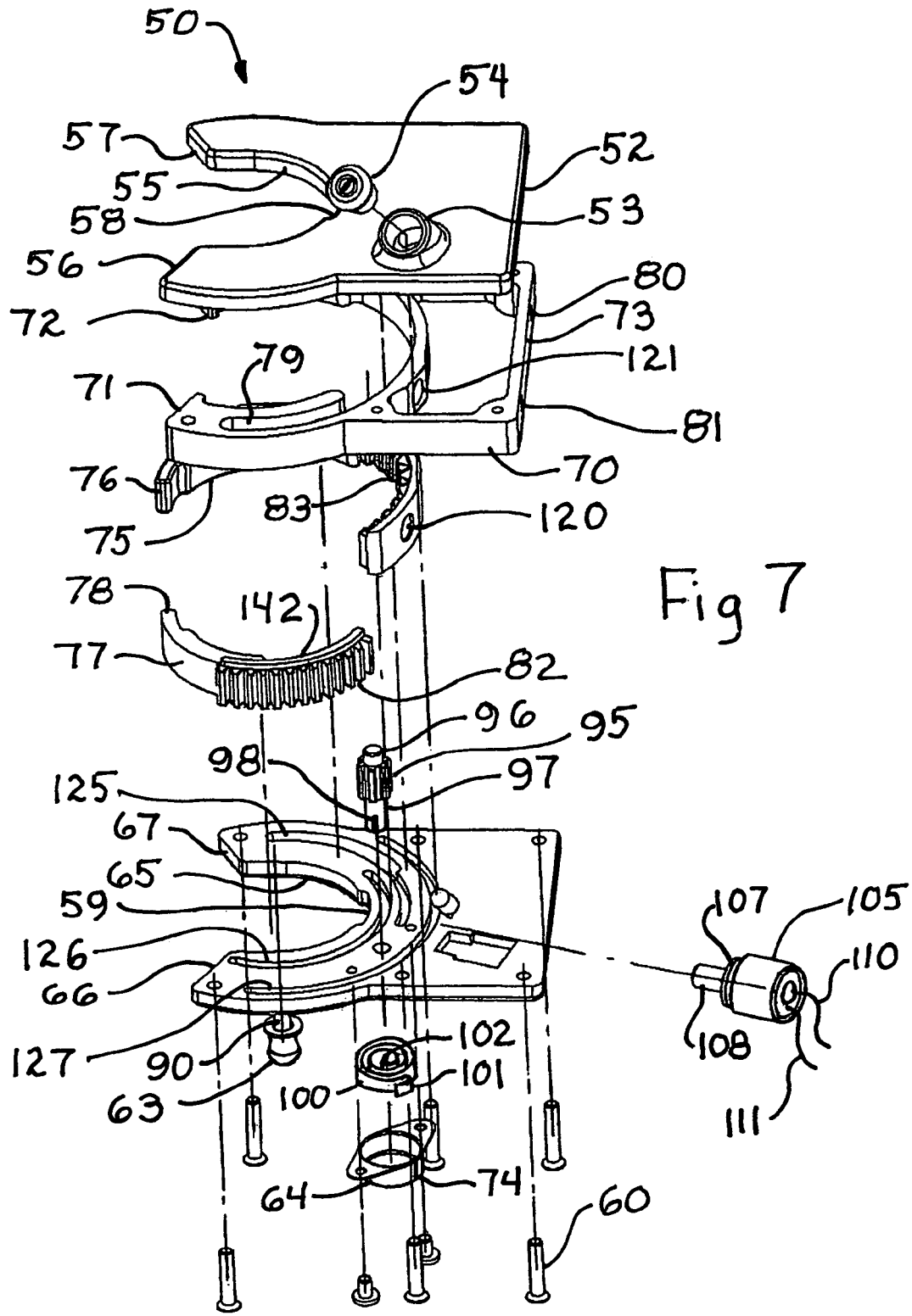
FIG. 7 sets forth a top perspective assembly view of the present invention gun lock.

FIG. 5 sets forth a right side view of gun lock 50 and its attachment to riser 21 utilizing a threaded fastener 47 received within threaded aperture 81 (seen in FIG. 7). Thus as set forth in FIG. 5, gun lock 50 includes a top plate 52 defining an upwardly angled key housing 53 within which a key lock mechanism 54 is supported. Gun lock 50 further includes a spacer 70 and a bottom plate 62. Bottom plate 62 further supports lock slide 63 and spring cap 64. Once again, it must be emphasized that in accordance with an important aspect of the present invention, gun lock 50 is capable of receiving and securing either automatic rifle 30 or shotgun 40 in the manner shown in FIGS. 4 and 5.

Figure 6:
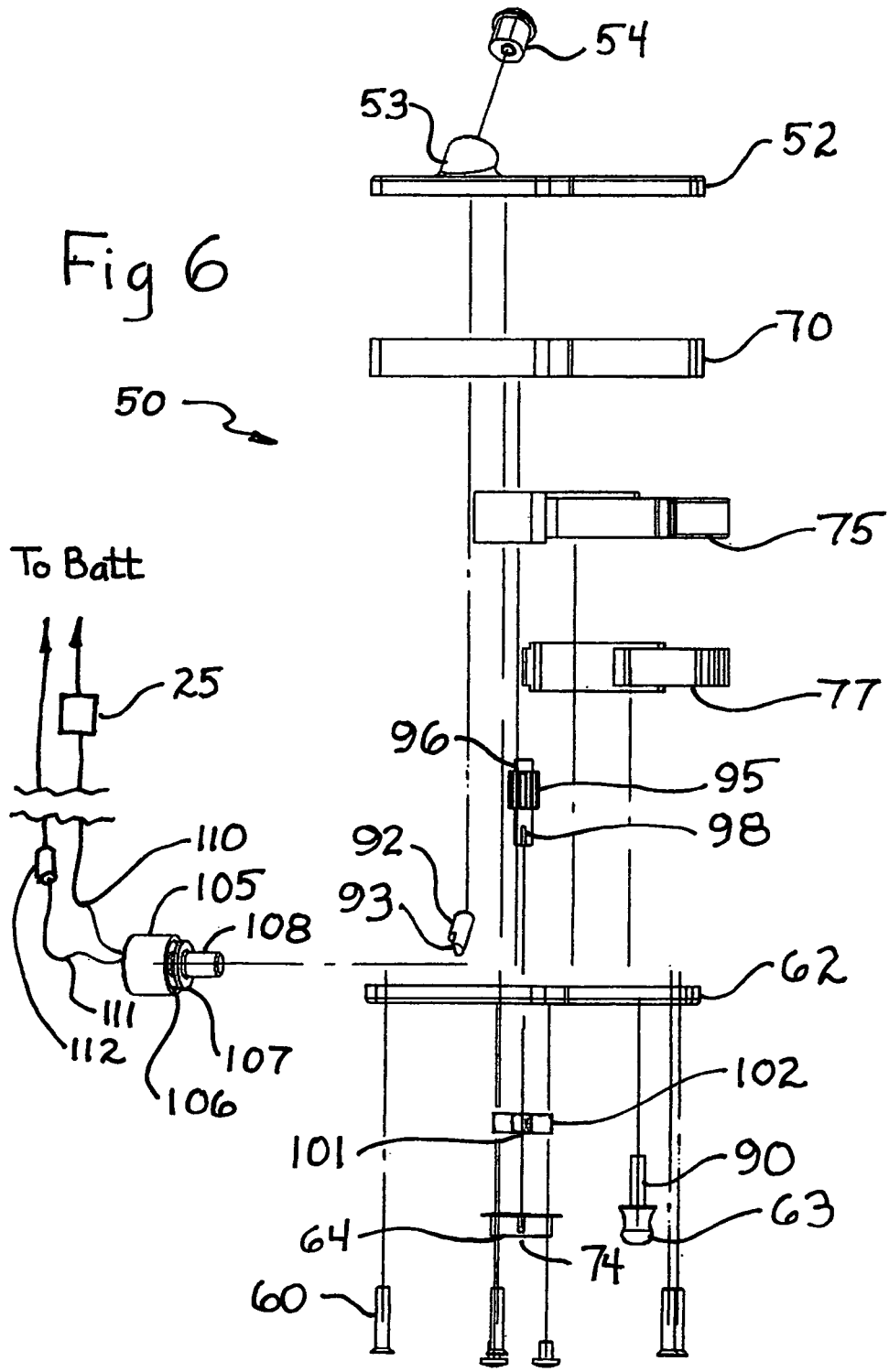
FIG. 6 sets forth a side assembly view of the present invention gun lock.

FIG. 6 sets forth a side assembly view of gun lock 50. As described above, gun lock 50 includes a top plate 52 supporting an angled key housing 53 which in turn supports a key lock mechanism 54. Gun lock 50 further includes a bottom plate 62 supporting a cap 64. A spacer 70 is positioned between top plate 52 and bottom plate 62 and the combination of top plate 52, spacer 70 and bottom plate 62 is secured utilizing a plurality of threaded fasteners 60 which are passed through bottom plate 62 and spacer 70 and which are threadably engaged within a plurality of threaded apertures 85 (seen in FIG. 8). In accordance with the present invention and as is more clearly set forth in FIGS. 9 and 10, gun lock 50 further includes a pair of curved lock gates 75 and 77. As is described below in greater detail in connection with FIGS. 9 and 10, curved lock gates 75 and 77 are received within spacer 70 and are directed to move in curved paths by a plurality of channels formed in top plate 52 and bottom plate 62 together with cooperating channels formed in spacer 70. As is also set forth below in FIGS. 9 and 10, lock gate 75 defines an internal curved gear rack while lock gate 77 defines an external curved gear rack. As is also better seen in FIGS. 9 and 10, gun lock 50 further includes a coupling gear 95 which is rotatably supported within spacer 70 by top plate 52 and bottom plate 62. Coupling gear 95 defines an upper shaft end 96 and a lower shaft end 97 received within top plate 52 and bottom plate 62 respectively. Coupling gear 85 is interposed between and meshes with the gear racks formed on lock gates 75 and 77. Shaft end 97 of coupling gear 95 further defines a slot 98. In further accordance with the present invention, gear lock 50 includes a coil spring 102 having a fixed end 101 and a movable end 102 (seen in FIG. 7). Coupling gear 95 engages spring 102 utilizing slot 98. Spring cap 64 is secured to bottom plate 62 by conventional fasteners and defines a slot 74 which is used to engage fixed end 101 of spring 102. As is described below in greater detail, spring 102 provides a restoring force which is established as gun lock 50 is moved to its closed position. As is also described below in greater detail, the stored energy within spring 102 is utilized to return gun lock 50 to an open position.

Gun lock 50 further includes a lock solenoid 105 which supports a lock shaft 108 upon which a flange 107 and a spring 106 are further supported. Solenoid 105 includes connection wires 110 and 111. Connecting wire 110 is coupled to a push button switch 25 which, as is mentioned above, is hidden within the vehicle interior. Connecting wire 111 is coupled to a fusible link 112 which in turn is coupled to the vehicle battery (not shown). Spring 106 exerts a force against flange 107 which moves shaft 108 of solenoid 105 to its extended or locking position in the absence of electrical energy applied to solenoid 105. As will be described below in greater detail, this force provided by spring 106 inserts shaft 108 through an aperture 121 in spacer 70 (seen in FIG. 8) and into an aperture 120 formed in lock gate 75 (seen in FIG. 7) to provide the locking feature of gun lock 50. The operation of solenoid 105 in providing the gun lock mechanism for locking and the electrical release provided by the action of solenoid 105 will be described below in greater detail. However, suffice it note here that in the absence of electrical power applied to solenoid 105, spring 106 forces shaft 108 and flange 107 outwardly to the above-described locking configuration. Conversely, when push button 25 is activated, electric power from the vehicle battery (not shown) is applied to solenoid 105 causing shaft 108 and flange 107 to move inwardly overcoming the force of spring 106 and thereby releasing the lock configuration of gun lock 50.

Gun lock 50 further includes a conventional key lock mechanism 54 received within housing 53. Lock mechanism 54 includes a lock cam 92 extending therefrom which in turn includes a camming surface 92. As is better seen in FIG. 10, the operation of key lock mechanism 54 and lock cam 92 facilitates a key override of gun lock 50 by which the operator is able to release the gun lock by simply inserting a key into key lock mechanism 54 and turning lock cam 93.

FIG. 7 sets forth a top perspective assembly view of gun lock 50. In the assembly view shown in FIG. 7, a top perspective view is utilized in which the upper surfaces of the major components of gun lock 50 are illustrated. The components of gun lock 50 are, for the most part, shown in FIG. 7 in their relative vertical positions.

More specifically, gun lock 50 includes a top plate 52 having an angled housing 53 receiving and supporting a key lock mechanism 54. As described above, top plate 52 defines a gun receptacle 55 and a notch 58. Top plate 52 further defines ends 56 and 57 on either side of receptacle 55. Gun lock 50 further includes a spacer 70 having ends 71 and 72 and a rear mounting surface 73. Mounting surface 73 further defines a pair of threaded apertures 80 and 81. Gun lock 50 further includes a bottom plate 62 defining a gun receptacle 65 and a notch 59. Bottom plate 62 further defines ends 66 and 67 on either side of gun receptacle 65. Gun lock 50 further includes a curved gate 75 having an end 76, a curved interior gear rack 83 and an aperture 120. Gun lock 50 further includes a lock gate 77 having an end 78 and an exterior gear rack 82. A coupling gear 95 includes an upper shaft 96 and a lower shaft 97. Coupling gear 95 further includes a spring slot 98 within lower shaft 97.

In accordance with the present invention, lock gate 75 and lock gate 77 are slidably supported within spacer 70 and are controlled in their sliding position by a plurality of guide channels formed in top plate 52 and bottom plate 62. A plurality of curved guides such as guide 142 shown on lock gate 77 cooperate with these curved guide channels to control the sliding movement of lock gates 75 and 77 in the manner described below in FIGS. 9 and 10. Thus, as is seen in FIG. 7, bottom plate 62 defines a pair of curved guide channels 126 and 127. Lock gate 75 defines a curved guide 141 (seen in FIG. 8) which is received within guide channel 127 of bottom plate 62. Similarly, lock gate 77 defines a curved guide 140 (seen in FIG. 8) which is received within guide channel 126 of bottom plate 162. Lock slide 63 includes a shaft 90 which extends upwardly through channel slot 125 of bottom plate 62 and is received within an aperture 86 (seen in FIG. 8) formed on the underside of lock gate 75. Coupling gear 95 is positioned between internal gear rack 83 of lock gate 75 and external gear rack 82 of lock gate 77 in the manner shown in FIGS. 9 and 10 below. The position of coupling gear 95 is maintained by bottom shaft 97 passing through aperture 130 formed in bottom plate 62. While not seen in FIG. 7, it will be understood that upper shaft 96 of coupling gear 95 is received within a similar aperture formed in top plate 52. Thus, coupling gear 95 is rotatably supported between gear racks 82 and 83. Lower shaft 97 extends through bottom plate 62 and engages a coil spring 100 as slot 98 receives movable end 102 thereof. An spring cap 64 is received upon spring 102 and maintains the position of spring 102 on the bottom surface of bottom plate 62. In addition, fixed end 101 of spring 100 is secured to spring cap 64. Thus, as coupling gear 95 rotates, spring 100 is wound or unwound depending upon the direction of rotation. Bottom plate 62 further defines a solenoid recess 133. A solenoid 105 having connecting wires 110 and 111 includes a flange 107 and a shaft 108. Solenoid 105 is received within solenoid recess 133 and captivated therein when bottom plate 62 is assembled to spacer 70 and top plate 52. Key lock mechanism 54 further includes a key lock cam 92.

Figure 8:
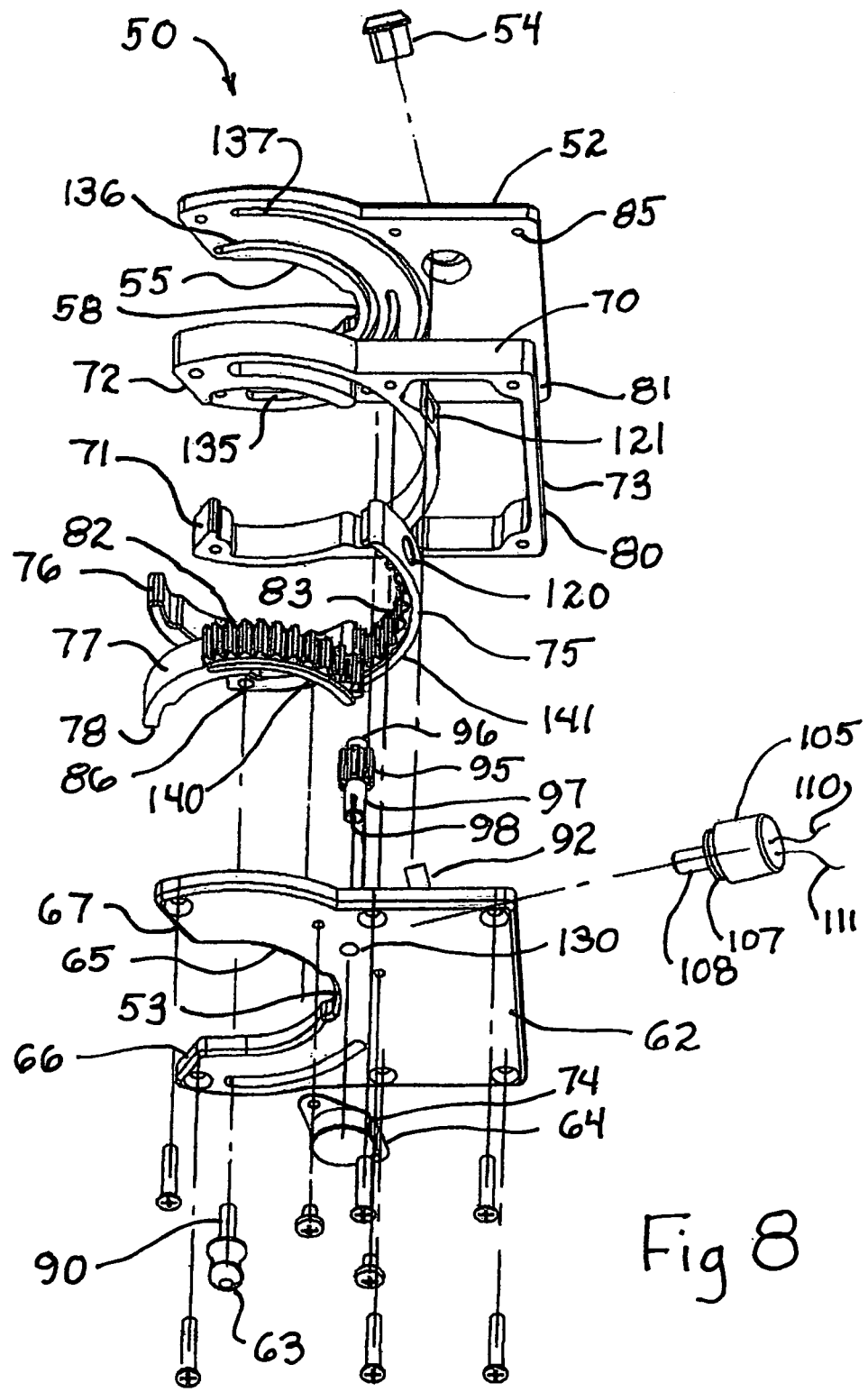
FIG. 8 sets forth a bottom perspective assembly view of the present invention gun lock.

FIG. 8 sets forth a bottom perspective assembly view of gun lock 50. In the bottom perspective view shown in FIG. 8, the bottom surfaces of components are more clearly seen. In particular, the underside of top plate 52 is more clearly seen in FIG. 8.

More specifically, gun lock 50 includes a top plate 52 having an angled housing 53 receiving and supporting a key lock mechanism 54. As described above, top plate 52 defines a gun receptacle 55 and a notch 58. Top plate 52 further defines ends 56 and 57 on either side of receptacle 55. Gun lock 50 further includes a spacer 70 having ends 71 and 72 and a rear mounting surface 73. Mounting surface 73 further defines a pair of threaded apertures 80 and 81. Gun lock 50 further includes a bottom plate 62 defining a gun receptacle 65 and a notch 59. Bottom plate 62 further defines ends 66 and 67 on either side of gun receptacle 65. Gun lock 50 further includes a curved gate 75 having an end 76, a curved interior gear rack 83 and an aperture 120. Gun lock 50 further includes a lock gate 77 having an end 78 and an exterior gear rack 82. A coupling gear 95 includes an upper shaft 96 and a lower shaft 97. Coupling gear 95 further includes a spring slot 98 within lower shaft 97.

As described above, lock gate 75 defines an aperture 120 and an end 76. As is also described above, lock gate 75 includes an internal curved gear rack 83. Lock gate 75 further defines an aperture 86. Lock gate 77 defines an end 78 and an exterior curved gear rack 82. Lock gate 77 further defines a curved guide 86. Gun lock 50 further includes a solenoid 105 having electrical coupling wires 110 and 111 together with an extending shaft 108. A flange 107 is supported upon shaft 108. Lock slide 63 includes a shaft 90 which extends upwardly through curved slot 125 formed in bottom plate 62. The upper end of shaft 90 is received within aperture 86 formed on the underside of lock gate 75. Lock gate 75 is received upon bottom plate 62 as curved guide 141 thereof is received within curved guide channel 127 formed in bottom plate 62 (seen in FIG. 7). Similarly, lock gate 77 is received upon bottom plate 62 as curved guide 140 is received within curved guide channel 126 of bottom plate 62 (seen in FIG. 7). Thus, lock gates 75 and 77 are movable upon bottom plate 62 in curved travel paths on either side of gun receptacle 65. Coupling gear 95 is inserted between gear racks 82 and 83 such that it engages both gear racks. This assembly is facilitated as lower shaft 97 of coupling gear 95 extends through aperture 130. Thereafter, spring cap 64 supporting spring 100 (seen in FIG. 7) are secured to bottom plate 62 such that slot 98 of shaft 97 engages spring 100 in the manner described above. With lock gate 75 and 77 supported upon bottom plate 62 and with coupling gear 95 installed, spacer 70 is positioned upon bottom plate 62 after which top plate 52 is positioned upon spacer 70. As is better seen in FIGS. 9 and 10, lock gate 75 defines a curved guide 143 and a curved guide 144. Similarly, lock gate 77 also best seen in FIG. 9 includes a curved guide 142. As top plate 52 is assembled upon spacer 70, curved guide 142 of lock gate 77 is received within a curved guide channel 136 formed on the underside of top plate 52. Similarly, curved guides 143 and 144 of lock gate 75 are received within curved guide channels 135 and 137 formed on the underside of top plate 52. During this assembly, solenoid 105 is captivated within solenoid recess 133 (seen in FIG. 7).

FIG. 9 sets forth a perspective view of gun lock 50 having top plate 52 removed from spacer 70 to expose the internal working components of the gun lock. It will be understood that in normal operation top plate 52 is secured in the manner described above using threaded fasteners 60. In the operational position shown in FIG. 9, gun lock 50 is entirely open which would normally allow a weapon within the gun lock to be withdrawn.

More specifically and as is described above, gun lock 50 includes a bottom plate 52 having ends 66 and 67. Gun lock 50 further includes a spacer 70 having ends 71 and 72 and defining a rear mounting surface 73. Mounting surface 73 defines a pair of threaded apertures 80 and 81. A lock gate 75 defines an end 76 together with curved guides 143 and 144. Lock gate 75 further defines an internal curved gear rack 83. Gun lock 50 further includes a lock gate 77 having an end 78 and including a curved guide 142. Lock gate 77 defines an external curved gear rack 82. A coupling gear 95 is positioned between gear racks 82 and 83 and engages both gear racks. Coupling gear 95 includes an upper shaft 96 which, as described above, is received within an aperture formed in top plate 52 (not shown).

Gun lock 50 further includes a key lock mechanism 54 supporting a downwardly extending lock cam 92. Lock cam 92 defines a cam surface 93. Gun lock 50 further includes a solenoid 105 having a pair of coupling wires 110 and 111 coupled to a source of operative electrical power (not shown). A lock slide 63 is movable upon the bottom surface of bottom plate 62 and by means described above engages lock gate 75 and is movable therewith. Lock gate 75 is movable within spacer 70 in a curved travel path due to the cooperation of curved guides 143 and 144 with curved guide channels 135 and 137 (seen in FIG. 8). Similarly, lock gate 77 is movable within spacer 70 in a curved travel path due to the cooperation of curved guide 142 within curved guide channel 136 of top plate 52 (seen in FIG. 8).

Lock 50 moves to the open configuration shown in FIG. 9 in response to the use of key 88 within key lock mechanism 54 or in response to electrical power applied to solenoid 105. In the event key 88 is turned in the direction indicated by arrow 150 within key lock mechanism 54, lock cam 92 is rotated to the position shown in FIG. 9. This rotation of lock cam 92 exerts a force against flange 107 overcoming the force of spring 106 (seen in FIG. 6) and withdrawing shaft 108 from aperture 120 formed in lock gate 75 (shown in FIG. 8). As shaft 108 is withdrawn from aperture 120 of lock gate 75, the stored energy within spring 102 (seen in FIG. 6) rotates coupling gear 95 in the direction indicated by arrow 152. The engagement of coupling gear 95 with gear racks 82 and 83 causes lock gates 75 and 77 to move within spacer 70 in the directions indicated by arrows 153 and 154 respectively. The energy stored within spring 102 (seen in FIG. 6) is a consequence of the locking action of gun lock 50 described below in FIG. 9. Suffice it to note here that movement of lock gates 75 and 77 outwardly to the closed configuration shown in FIG. 10 results in rotation of coupling gear 95 against spring 102 and in the opposite direction of arrow 152 thereby storing energy therein. It will be noted that the opening action movement of lock gates 75 and 77 also moves lock slide 63 in the direction indicated by arrow 155. Thus, in FIG. 9, gun lock 50 is stable in its open configuration. As a result, a weapon may be inserted into gun lock 50 in a single hand operation. It is not necessary to manually maintain the open configuration of gun lock 50.

FIG. 10 sets forth a perspective view of gun lock 50 similar to FIG. 9 in that top plate 52 is omitted to facilitate the illustration of the internal working components of gun lock 50. In contrast to FIG. 9, FIG. 10 shows gun lock 50 in a closed and locked configuration.

More specifically and as is described above, gun lock 50 includes a bottom plate 52 having ends 66 and 67. Gun lock 50 further includes a spacer 70 having ends 71 and 72 and defining a rear mounting surface 73. Mounting surface 73 defines a pair of threaded apertures 80 and 81. A lock gate 75 defines an end 76 together with curved guides 143 and 144. Lock gate 75 further defines an internal curved gear rack 83. Gun lock 50 further includes a lock gate 77 having an end 78 and including a curved guide 142. Lock gate 77 defines an external curved gear rack 82. A coupling gear 95 is positioned between gear racks 82 and 83 and engages both gear racks. Coupling gear 95 includes an upper shaft 96 which, as described above, is received within an aperture formed in top plate 52 (not shown).

Gun lock 50 further includes a key lock mechanism 54 supporting a downwardly extending lock cam 92. Lock cam 92 defines a cam surface 93. Gun lock 50 further includes a solenoid 105 having a pair of coupling wires 110 and 111 coupled to a source of operative electrical power (not shown). A lock slide 63 is movable upon the bottom surface of bottom plate 62 and by means described above engages lock gate 75 and is movable therewith. Lock gate 75 is movable within spacer 70 in a curved travel path due to the cooperation of curved guides 143 and 144 with curved guide channels 135 and 137 (seen in FIG. 8). Similarly, lock gate 77 is movable within spacer 70 in a curved travel path due to the cooperation of curved guide 142 within curved guide channel 136 of top plate 52 (seen in FIG. 8).

Gun lock 50 is moved from the open configuration shown in FIG. 9 to the closed and locked configuration shown in FIG. 10 by the movement of lock slide 63 in the direction indicated by arrow 161. As indicated in FIG. 10, the movement of lock slide 63 is a manual movement in which the patrol officer simply presses lock slide 63 forwardly in the direction of arrow 161. The forward movement of lock slide 63 in the direction of arrow 161 causes lock gate 75 to move in the direction indicated by arrow 162. Concurrently, the movement of lock gate 75 in the direction indicated by arrow 162 moves gear rack 83 in the same direction which in turn rotates coupling gear 95 in the direction indicated by arrow 164. The rotation of coupling gear 95 in the direction indicated by arrow 164 in turn moves gear rack 82 of lock gate 77 in the direction indicated by arrow 163. The movement of lock gates 75 and 77 in the directions indicated by arrows 162 and 163 brings lock gate ends 76 and 77 together closing gun lock 50. As mentioned above, the rotation of coupling gear 95 during the closing movements of lock gates 75 and 77 is against spring 102 (seen in FIG. 6) and, as a result, energy is stored as spring 102 is wound by rotation of gear 95. Once lock gates 75 and 77 have moved to the fully closed position, the latch mechanism formed by the cooperation of solenoid 105, spring 106, flange 107 and solenoid shaft 108 together with aperture 120, formed in lock gate 75 and aperture 121 formed in spacer 70 latch the position of lock gate 75. The operation of this latch mechanism is set forth below in greater detail in FIG. 12. However, suffice it to note here that as aperture 120 of lock gate 75 (seen in FIG. 8) is brought into alignment with aperture 121 of spacer 70 (also shown in FIG. 8) spring 106 is able to force the end of shaft 108 of solenoid 105 through aperture 121 and into aperture 120 (seen in FIG. 12). The extension of shaft 108 into aperture 121 of lock gate 75 secures the position of lock gate 75 against any further movement. The engagement of coupling gear 95 between gear racks 82 and 83 also prevents movement of lock gate 77. As a result so long as shaft 108 extends forwardly into aperture 120 formed in lock gate 75 (seen in FIG. 12), neither lock gate 75 nor lock gate 77 may be moved and the closed and secured condition of gun lock 50 is maintained.

With gun lock 50 in the closed and locked configuration shown in FIG. 10, access to a weapon captivated within gun lock 50 is, of course, prevented. In accordance with an important aspect of the present invention, gun lock 50 may be quickly and easily opened providing access to a weapon therein utilizing either access which employs a key within lock mechanism 54 or, alternatively, electrical activation of solenoid 105. Activation of solenoid 105 withdraws flange 107 and shaft 108 outwardly from engagement with lock gate 75 as the solenoid force overcomes the force of spring 106. In further accordance with an important aspect of the present invention once solenoid 105 has been activated, the patrol officer has immediate access to a weapon within gun lock 50 as the spring force stored within spring 102 which took place during the closing of gun lock 50 described above causes an immediate rotation of coupling gear 95. The rotation of coupling gear 95 in the direction indicated by arrow 152 in FIG. 9 causes immediate opening of lock gates 75 and 77 without the need of manual manipulation by the officer. In other words, once the activation button has been pressed energizing solenoid 105, lock gates 75 and 77 immediately and rapidly snap to the open configuration of FIG. 9 without further manipulation by the police officer. This results in immediate access to the locked weapon. In addition, the opening of lock gates 75 and 77 to the configuration shown in FIG. 9 results in a fully open access for the weapon therein to be withdrawn without any interference of the gun lock.

As an alternative to opening gun lock 50 utilizing the hidden button and energizing of solenoid 105, the user may insert key 88 into key lock mechanism 54 and rotate the key as indicated by arrow 160. The rotation of the mechanism within key lock mechanism 54 rotates shaft 92 moving cam surface 93 against flange 107 and overcoming the force of spring 106. As lock cam 92 continues to rotate and force flange 107 against spring 106, shaft 108 is withdrawn from aperture 120 of lock gate 75 (seen in FIG. 8).

FIG. 11 sets forth a partial section view of gun lock 50 taken along section lines 11-11 in FIG. 10. FIG. 11 provides illustration of the function of coupling gear 95 in engagement with gear racks 82 and 83. It is this coupling that produces equal curved path travel of lock gates 75 and 77. In addition this engagement also ensures that once the latch provided by solenoid 105 and solenoid shaft 108 lock the position of lock gate 75, the position of lock gate 77 is also locked.

More specifically, top plate 52 defines an aperture 124 and curved guide channels 135 and 137. Similarly, bottom plate 62 defines an aperture 130, aligned with aperture 124, and curved guide channels 126 and 127. Coupling gear 95 includes a shaft end 96, received in aperture 124 and a shaft end 97 extending through aperture 130. Shaft end 97 defines a spring slot 98. A coil spring 100 has a movable end 102 received within spring slot 98. A cap 64 is secured to bottom plate 62 by conventional fasteners (seen in FIG. 7). Cap 64 defines a slot 74 that receives fixed end 101 of spring 100. Lock gate 75 defines curved guides 144 and 145 received within guide channels 137 and 127 respectively. Similarly, lock gate 77 defines curved guides 140 and 143 received within guide channels 126 and 135 respectively. Lock gate 75 defines curved gear rack 83 while lock gate 77 defines gear rack 82, both of which engage coupling gear 95.

FIG. 12 sets forth a partial section view of solenoid 105 and the latch mechanism operative upon lock gate 75. It will be recalled that the locking of lock gate 75 together with the engagement of coupling gear 95 with both gear racks 82 and 83 ensures that locking lock gate 75 also locks the position of locking gate 77 (described above). Solenoid 105 is supported within solenoid recess 133 of bottom plate 62. Solenoid 105 supports a solenoid shaft 108 and a flange 107 joined to shaft 108. A compression spring 106 is captivated between solenoid 105 and flange 107 and exerts a force against flange 107 in the direction indicated by arrow 138. This, in turn, urges solenoid shaft 108 in the direction indicated by arrow 138. FIG. 12 will be understood to show the position of lock gate 75 corresponding to the closed configuration shown above in FIG. 10. As in described above the positioning of lock gates 75 and 77 brings aperture 120 of lock gate 75 into alignment with aperture 121 of spacer 70. With aperture 120 thus aligned, the force of spring 106 drives the end of solenoid shaft into aperture 120 locking the position of lock gate 75 and securing the locked condition of the gun lock. The latch thus provided is released by either activating solenoid 105 electrically in the direction indicated by arrow 131 or using key mechanism 54 (seen in FIG. 9) to cam flange 107 in the direction indicated by arrow 129 draw shaft 108 outwardly from aperture 120. Once the end of solenoid shaft 108 is withdrawn to the position shown by dashed line 128, lock gate 75 is movable and the lock is released. The stored energy within spring 100 (seen in FIG. 11) rotates coupling gear 95 rapidly causing lock gates 75 and 77 to snap to the open configuration shown in FIG. 9. Thus, opening of the present invention gun lock whether achieved by electrically activating solenoid 105 or manipulation of a key within key lock mechanism 54 results in immediate and rapid opening of the gun lock.

What has been shown is a novel gun lock for use in securing a weapon to a gun rack within a vehicle interior or the like. The novel gun lock shown is small and compact and utilizes a minimum of space and imposes a very small weight upon the vehicle. When operated, the gun lock of the invention snaps to an open configuration in a quick certain movement allowing the officer immediate access to the weapon. Manual manipulation of a gate or lock cover is not required.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A gun lock comprising:
   a gun lock body defining a mounting surface and an open sided gun receptacle;
   a first, curved, lock gate defining a first end and a first, concave, gear rack;
   a second, curved, lock gate defining a second end and a second, convex, gear rack;
   a pair of guides each supporting a respective one of said first and second lock gates such that said first, concave, gear rack and said second, convex, gear rack face each other defining a space therebetween and guiding said first and second lock gates for curved sliding movement between a closed position, in which said first and second ends of said first and second lock gates meet and an open position in which said first and second ends are spaced apart exposing said gun receptacle;
   a coupling gear supported for rotational motion between said first and second gear racks engaging each of said first and second gear racks simultaneously; and
   a lock post engaging at least one of said first and second lock gates when said pair of lock gates are in said closed position.

2. The gun lock set forth in claim 1 wherein said first and second lock gates and said first and second gear racks are substantially arcuate and wherein said pair of guides are substantially arcuate.

3. The gun lock set forth in claim 2 wherein said first and second lock gates define respective first and second curved guide members and wherein said pair of guides includes a pair of curved guide channels each receiving one of said curved guide members.

4. The gun lock set forth in claim 3 wherein said lock post includes:
   an electric solenoid having a solenoid shaft movable between a withdrawn position and an extended; and
   a spring urging said solenoid shaft toward said extended position, said solenoid shaft engaging one of said lock gates,
   said solenoid responding to electrical activation by moving said solenoid shaft to said withdrawn position.

5. The gun lock set forth in claim 4 wherein said solenoid shaft includes a flange and wherein said spring is captivated against said flange.

6. The gun lock set forth in claim 5 further including a key override comprising:
   a key receiving mechanism supported upon said gun lock body near said solenoid having a key shaft rotatable solely when turned by a key, said key shaft defining a cam positioned against said flange,
   said cam forcing said flange against said spring to move said shaft to its withdrawn position when said key is turned.

7. The gun lock set forth in claim 6 wherein said solenoid is coupled to a switched source of electrical power by a fusible link.

8. The gun lock set forth in claim 7 further including a lock slide coupled to one of said first and second lock gates for manually moving said first and second lock gates.

9. A gun lock comprising:
   a gun lock housing defining a gun lock receptacle having a closed end, spaced apart sides and an open end;
   a first lock gate having a first elongated curved body, a first outer end, an internal concave curved gear rack and a first curved guide;
   a second lock gate having a second elongated curved body, a second outer end, an external convex curved gear rack and a second curved guide;
   a first curved guide channel formed in said gun lock housing receiving said first curved guide, said first curved channel and said first curved guide cooperating to support said first lock gate within said first curved channel and to allow curved path movement of said first lock gate within said gun lock housing;
   a second curved guide channel formed in said gun lock housing receiving said second curved guide, said second curved channel and said second curved guide cooperating to support said second lock gate within said second curved channel spaced from said first lock gate thereby defining a space between said first and second lock gates and to allow curved path movement of said second lock gate within said gun lock housing;

a coupling gear rotatably supported by said gun lock housing within said space between said first and second lock gates and engaging said; internal concave curved gear rack and said external convex curved gear rack and a latch engaging at least one of said first and second lock gates to establish a fixed position and prevent movement thereof, said first and second lock gates being slidably movable between a closed position in which said first and second ends abut closing said open end of said gun lock receptacle and an open position clearing said open end of said gun lock receptacle, and said closed position being said fixed position of said latch.

* * * * *